March 23, 1965
A. DRECHSEL
3,174,770
SPRING SUSPENSION FOR VEHICLES
Filed Nov. 2, 1961
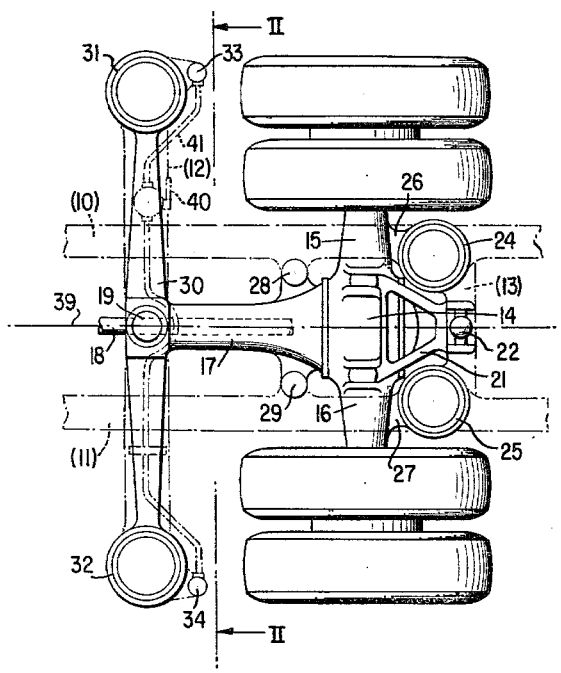
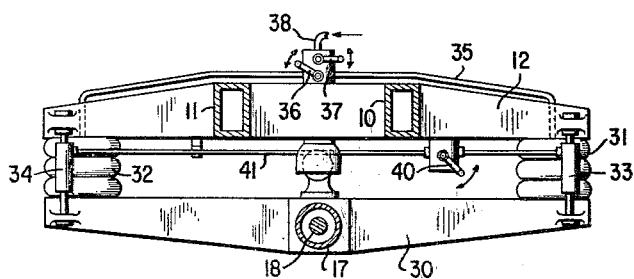
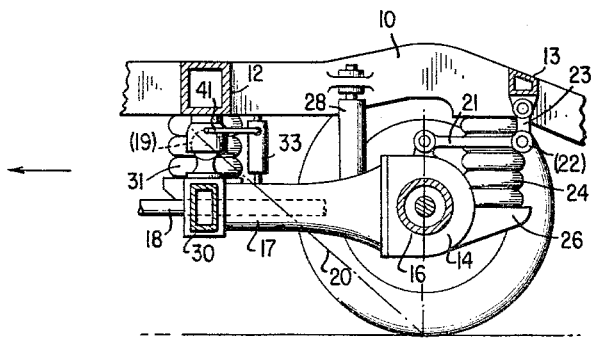
INVENTOR.
ARMIN DRECHSEL
BY Dicke and Craig
ATTORNEYS.

3,174,770
SPRING SUSPENSION FOR VEHICLES
Armin Drechsel, Stuttgart, Germany, assignor to Daimler-Benz Aktiengesellschaft, Stuttgart-Unterturkheim, Germany
Filed Nov. 2, 1961, Ser. No. 149,702
Claims priority, application Germany, Nov. 12, 1960, D 34,724
16 Claims. (Cl. 280—112)

The present invention relates to a spring system for vehicles, especially motor vehicles, and more particularly relates to such a spring system which is suitable for heavy units such as trucks and busses which are subjected to considerable changes in the load.

With certain heavy-duty vehicles, for example, semi-trailers, the centrifugal force moment varies approximately between 1:20 whereas the load of the springs varies only within the limits of approximately 1:5. The ratios express the following conditions: When the vehicle weight to be supported by the springs as static weight has a certain value in an unloaded vehicle, then it has, obviously, a higher value for the loaded vehicle, namely a value which is approximately up to five times higher (depending upon the weight of the additional load).

The moment which has the tendency and seeks to swing the vehicle body outwardly together with the load therein about the vehicle longitudinal axis during driving through a curve (at a certain speed and at a certain radius of the curve), would be, first, five times as large with a vehicle loaded to capacity when compared to the condition of the unloaded vehicle, because the centrifugal force of the mass is proportionate. Furthermore, this movement is also influenced by the position of the total center of gravity of the vehicle. The higher it is, i.e., the more it is loaded at the same weight, the greater becomes the torsional moment exerted due to the centrifugal force. This is the explanation for the ratio 1:20 in the final result. The value 1 corresponds therein to an unloaded vehicle, and the value 20 corresponds to a vehicle loaded with the largest or highest possible load, wherein the center of gravity is positioned particularly high due to the kind of load. The moment of inertia about the rolling axis is varied still more strongly than the centrifugal force moment in the curve by reason of the square function of the radius of gyration. Consequently, it is no wonder that certain heavy duty vehicles exhibit, notwithstanding the control of the springs by the use of pneumatic springs, in dependence on the weight and position of the load, on the one hand, relatively high frequency fluctuating swinging movements and, on the other, an excessively large curve-tilting tendency, the tendency of the vehicle body to turn outwardly about a longitudinal vehicle axis when driving through curves due to the moment exerted by the centrifugal force. By reason of the periodic swinging movements about the longitudinal axis, the damping thereof finally had to be selected so hard that it became far too strong for the stroke swinging movements, oscillations or swinging in the direction perpendicular to the road, and that the advantage hoped for by the use of pneumatic springs of a better absorption of the road shocks was again lost in a far reaching manner.

The present invention aims at an overall arrangement of the axle or wheel guidance, of the spring system and of the damping system in which the aforementioned disadvantages are avoided. In particular, it is required of the arrangement in accordance with the present invention that the springs be capable of imparting to the vehicle a considerably larger stability about a longitudinal axis notwithstanding an effective shock absorption, which larger stability, however, may again be reduced under different driving conditions. Additionally, not only the springs but under certain conditions also the damping devices are adapted to be adjusted in dependence on the load as well as in dependence on the center of gravity or possibly even in dependence on the moment of inertia. Of course, the guidance of the axle or wheels is to be such as to offer good characteristics and the advantages enumerated hereinabove are to be achieved in accordance with the present invention with relatively slight structural expenditures.

According to the present invention, a spring system is proposed having a separation of the functions of the spring system through the separation of the springs into (a) springs essentially performing the carrying or supporting function and (b) springs performing essentially leveling or lifting functions about the longitudinal axis with respect to tilting movements, in which the leveling springs, preferably constructed as pneumatic springs, are adapted to be regulated in the sense of a change of the leveling moment. In particular, the present invention contemplates an axle which is pivotally connected for universal movement with respect to the vehicle frame or the vehicle body end portion by means of a material or ideal joint, i.e., by means of an actual or effectively equivalent joint disposed in the vertical longitudinal center plane of the vehicle outside of the vertical transverse plane passing through the wheel centers, which is guided for angular movements by this joint, as well as other connecting means, about the vehicle longitudinal axis; which is supported in the vertical direction with respect to the vehicle frame or vehicle body end portion by springs, preferably adjustable pneumatic springs, having, however, a relatively small return force about the longitudinal axis, and which is additionally supported in case of transverse tilting movements with respect to the vehicle frame or body end portion by springs, also preferably adjustable pneumatic springs, which are disposed essentially laterally of the aforementioned joint in front, or to the rear, of the wheels of the axle.

The control of the different springs and damping devices does not have to be carried through to the ultimate consequence, for with many types of vehicles it will suffice to leave some individual springs or damping devices non-regulated or to provide instead of a continuous regulation a stepped control or regulation thereof.

Accordingly, it is an object of the present invention to provide a spring system, especially for heavy duty vehicles which obviates the shortcomings and inadequacies of the prior art spring systems in a simple and effective manner that does not involve any significant cost increases for additional structural expenditures.

It is another object of the present invention to provide a spring system, especially for heavy duty motor vehicles, which effectively eliminates an excessive curve-tilting tendency yet maintains the advantages realizable by the use of pneumatic springs, namely of a very good absorption of road shocks.

A further object of the present invention resides in the provision of a spring system, particularly for heavy type vehicles such as trucks and busses in which relatively high frequency swinging movements are completely eliminated.

A further object of the present invention resides in the provision of a spring system which permits adaptation of the spring system to widely varying driving conditions, especially if the vehicle is used with widely varying loads.

Still another object of the present invention resides in the provision of a spring system in which not only the springs but also the damping means, for example, the shock absorbers, are adapted to be adjusted, preferably automatically, in depedence on any one or all of the load, the center of gravity and the inertia moment of the vehicle.

A further object of the present invention resides in the provision of a vehicle spring system of the type described hereinabove which achieves all of the aforementioned advantages in a simple manner while at the same time preserving a good guidance of the axle or wheels spring-suspended thereby.

Still a further object of the present invention resides in the provision of a spring system for vehicles in which the separation of the functions of the various springs and parts of the spring system may be utilized for widely varying applications by the use of different, varying controls.

These and other objects, features and advantages of the present invention will become more obvious from the following description when taken in connection with the accompanying drawing which shows, for purposes of illustration only, one embodiment in accordance with the present invention, and wherein FIGURE 1 is a top plan view of the rear axle of a truck-type vehicle provided with a spring system in accordance with the present invention, the frame disposed above the spring system being indicated in this figure in dot and dash lines;

FIGURE 2 is a transverse cross sectional view taken along line II—II of FIGURE 1; and FIGURE 3 is a longitudinal cross sectional view of the spring system of FIGURE 1 taken in a plane parallel to the vertical longitulinal center plane of the vehicle.

Referring now to the drawing wherein like reference numerals are used throughout the various views to designate like parts, there may be seen in FIGURE 1, in dot-and-dash lines, the longitudinal bearers 10 and 11 as well as the cross bearers 12 and 13 forming part of the vehicle frame. While the bearers 10, 11, 12 and 13 have been indicated as separate frame elements, it is understood that they may also be constituted by a self-supporting type body construction. Consequently, the term vehicle superstructure is used hereinafter in the specification and in the claims to designate broadly those parts which perform in any given vehicle the function of the bearers 10, 11, 12 and 13 or are equivalent thereto.

Of the unsprung masses, the axle gear housing 14, the two trumpet-like axle parts 15 and 16, the thrust tube 17 and the cross bearer member 30 form a rigid unit or combination which is pivotally connected for universal movement by means of the ball joint 19 at the cross bearer member 12 of the vehicle frame in the center thereof. The drive shaft 18 of any suitable construction adjoins the forward end of the thrust tube 17. The lateral guidance of this combination takes place, in addition to the guidance provided by the ball joint 19, with the aid of a triangularly-shaped longitudinal guide member 21 by means of the ball joint 22 which is operatively connected through a vertical shackle member 23 with the cross bearer member 13 of the vehicle frame. The forward end of member 21 is pivotally connected to the axle. Consequently, the rigid combination is capable of carrying out angular movements about a transverse axis passing through the ball joint 19 and about a longitudinal axis determined by the ball joints 19 and 22.

Two groups of springs and two groups of damping devices are accommodated between the aforementioned rigid combination and the vehicle superstructure. Among these, the pneumatic springs 24 and 25, with the aid of longitudinally extending spring-supports 26 and 27, support the rigid combination vertically against the vehicle superstructure in such a manner that the rigid combination is pressed against the road by the weight of the vehicle end portion falling thereon. Consequently, this part of the spring system deals with a carrying or supporting function of the springs. Simultaneously therewith, the pneumatic springs 24 and 25 produce in addition thereto, a certain return effect about the longitudinal axis of the vehicle by reason of the spacing of these springs which spacing, however, is relatively small by reason of the small spring base. The two damping devices 28 and 29 which take care of the damping or elimination of periodic swinging movements at this place, are operatively associated with or coordinated to the pneumatic springs 24 and 25 since due to the small distance they are spaced from each other, they will become active essentially only in case of up- and down-swinging movements of the rear axle. A relative movement of the vehicle body about the longitudinal axis with respect to the rear axle body, on the other hand, is hardly noticeable on the damping devices 28 and 29.

In addition to the pneumatic springs 24 and 25, two further pneumatic springs 31 and 32 are effective between the aforementioned rigid combination and the vehicle superstructure. These additional springs 31 and 32 are disposed laterally toward the outer sides of the vehicle, laterally of the ball joint 19 between the bearers 12 and 30 and, since the relative movement of these two bearers 12 and 30 is confined by the ball joint 19 to angular movement, can exercise only a return movement about the longitudinal axis of the vehicle. Consequently, the springs 31 and 32 assume a leveling function, whereby the moments produced may be very large by reason of the broad spring base. The damping devices 33 and 34 are functionally coordinated to or operatively associated with these pneumatic springs 31 and 32 since they do not become operative when the rear axle exerts up- and down-movements, but become fully operative when the vehicle body is inclined about the longitudinal vehicle axis.

The pneumatic springs 31 and 32 are connected with each other through an equalization line 35. The equalization line 35 may be throttled or closed by actuation of a lever 36 adapted to be actuated manually and/or automatically in any suitable known manner. The pneumatic springs 31 and 32 are additionally connected through line 38 with an air supply system and are able to undergo pressure changes by adjustment of the lever 37 which is also adapted to be actuated manually and/or automatically in any suitable known manner.

The damping devices 33 and 34 are operatively connected with each other by an equalization line 41 adapted to be closed by actuation of a lever 40 which is also adapted to be actuated manually and/or automatically in any suitable known manner.

With respect to the operation of the spring system described hereinabove, it follows from what has been said hereinabove that maintaining the vehicle body end portion level, insofar as it concerns the rear axle, depends primarily on the springs 31 and 32 which are adapted to be regulated or adjusted with the aid of a variable air pressure and of the throttling or disconnectable equalization system since, when, with the aid of lever 36, an equalization is established between the inner spaces of the springs 31 and 32, the system is not in a position to exert a moment on the vehicle body. On the other hand, when the equalization is prevented or at least throttled, the system can then exert a moment on the vehicle body which will become larger the greater is the air pressure within that spring on whose side the vehicle body is intended to be raised. Even though springs 24 and 25 also produce a return effect about the longitudinal axis of the vehicle, this return-capability of springs 24 and 25 is no greater than corresponds to the minimum requirement of the vehicle. Consequently, no obstacle stands in the way to a satisfactory regulation within the desired regulating range.

The regulating possibility may be used for the purpose of metering the return-capability about the longitudinal axis in any suitable known manner in dependence on the loading condition and driving situation of the vehicle. If it concerns, for example, a heavily loaded or highly loaded truck-type vehicle, then any desired maximum in curve stability may be imparted to this vehicle notwithstanding a relatively soft basic spring system and, after it is unloaded, the vehicle may, upon adjustment of the lever 37, be returned nevertheless with a relatively low fluctuating or oscillating swinging frequency to a spring comfort which may surpass in some respects and under certain circumstances the spring comfort commonly found nowadays in ordinary passenger motor vehicles. This is possible because it weight is greater than that of the passenger vehicle and because the control, in contrast thereto, also effectively permits disengagement or rendering ineffectual, with the aid of lever 36, the return-capability of the stabilizing springs 31 and 32 during straight drives since, when the lever 36 is in such a position that via the conduit 35, an equalization is established between the inner spaces of the springs 31 and 32, the system cannot exert a moment on the vehicle body which has a tendency to return the same to the normal position. In that case, the varying or fluctuating swinging movements are determined only by the springs 24 and 25 as well as by the corresponding springs of the front axle so that they have considerably smaller amplitudes, a lower frequency and a lesser angular acceleration.

It should also be noted in connection with the operation of the arrangement according to the present invention that it produces a relatively high axis of instantaneous rotation, that it brings about a very complete equalization of the braking and accelerating nodding or nose-dive moments by reason of the utilized axle guidance, in particular by reason of the position of the axis 20 shown in FIGURE 3, and that from a weight point of view, as demonstrated by calculation of the bending moments, it is no less favorable and even more favorable than the usual arrangements notwithstanding the forward displacement of the stabilizing springs.

While I have shown and described one embodiment in accordance with the present invention, it is understood that the same is not limited thereto, but is susceptible of many changes and modifications within the scope of a person skilled in the art. For example, in the place of the thrust tube 17, a frame may be provided which has a cross bracing or another torsion-rigid structural element. In lieu of the rigid axle, an axle with independently spring-suspended wheels may be constructed in an obvious manner within the teachings of the present invention. The spring system in accordance with the present invention is applicable to the rear axle as well as to the front axle, and it may be further so constructed by means of a corresponding conventional control arrangement of the air pressure or hydraulic medium that the curve tilting tendency is completely eliminated or even transformed into a positive curve tilting tendency directed toward the inside of the curve. Additionally, any suitable manual, semi-automatic and/or fully automatic control system may be used for the selective throttling and/or closing of the equalization lines between the springs and between the shock absorbers.

Thus, it is obvious that the present invention is susceptible of many changes and modifications within the spirit and scope thereof, and I therefore do not wish to be limited to the details shown and described herein, but intend to cover all such changes and modifications as are encompassed by the scope of the appended claims.

I claim:
1. A spring system for vehicles, especially motor vehicles, having a vehicle superstructure and axle means for supporting thereon the oppositely disposed vehicle wheels, comprising a substantially rigid unit including said axle means, transverse bearer means extending substantially in a transverse vehicle plane spaced in the vehicle longitudinal direction from the vertical transverse plane of the vehicle passing through the centers of said wheels and torsion resistant means interconnecting said axle means with said transverse bearer means, means pivotally connecting said substantially rigid unit at said vehicle superstructure for universal movement with respect thereto at a point disposed essentially at the intersection of the vertical vehicle longitudinal center plane and of a vertical transverse plane passing through said transverse bearer means, second pivotal connecting means for pivotally connecting said rigid combination at said vehicle superstructure in such a way that said rigid unit is able to perform angular movements about a transverse axis passing through said first pivotal connecting means and about a longitudinal axis extending through said first and second pivotal connecting means, first spring means including a pair of springs spaced from each other a relatively small distance for providing essentially the entire support of the weight of the respective end portion of said vehicle superstructure on said axle means, and further spring means for providing a leveling force for leveling of said vehicle superstructure including a pair of springs disposed at a relatively large distance from the vertical vehicle longitudinal center plane and operative to oppose a predetermined spring force to tilting movements of the vehicle superstructure about said vehicle longitudinal axis.

2. A spring system for vehicles, especially motor vehicles, having a vehicle superstructure and axle means for supporting thereon the oppositely disposed vehicle wheels, comprising a substantially rigid unit including said axle means, transverse bearer means extending substantially in a transverse vehicle plane spaced in the vehicle longitudinal direction from the vertical transverse plane of the vehicle passing through the centers of said wheels and torsion resistant means interconnecting said axle means with said transverse bearer means, means pivotally connecting said substantially rigid unit at said vehicle superstructure for universal movement with respect thereto at a point disposed essentially at the intersection of the vertical vehicle longitudinal center plane and of a vertical transverse plane passing through said transverse bearer means, second pivotal connecting means disposed also at a distance from the vertical transverse plane passing through the wheel centers for pivotally connecting said rigid combination at said vehicle superstructure in such a way that said rigid unit is able to perform angular movements about a transverse axis passing through said first pivotal connecting means and about a longitudinal axis extending through said first and second pivotal connecting means, first spring means for supporting essentially the entire weight of the respective end portion of said vehicle superstructure on said axle means comprising a pair of springs disposed a relatively small distance from the vehicle axle means in the vehicle longitudinal direction and spaced from each other and from the said vertical vehicle longitudinal center plane a relatively small distance, and further spring means for providing a leveling force for leveling of said vehicle superstructure comprising a pair of springs disposed at a relatively large distance from the vertical vehicle longitudinal center plane and operative to oppose a predetermined spring force to tilting movements of the vehicle about said vehicle longitudinal axis.

3. A spring system for vehicles, especially motor vehicles, with at least a partial separation of the functions of the springs by subdividing the springs into springs performing essentially supporting functions and springs essentially performing leveling functions with respect to tilting movements of the vehicle about a longitudinal axis, comprising a vehicle superstructure, axle means, means spring-supporting said axle means with respect to said superstructure including first spring means for performing substantially the entire supporting function, second spring means for performing said leveling functions, means for enabling adjustment of said second spring means in the sense of a change of the leveling moment produced thereby, first connecting means for connecting said axle means to said vehicle superstructure for effective universal movement relative thereto, said first connecting means being disposed substantially in the vertical vehicle longitudinal center plane outside of the vertical vehicle transverse plane passing through the wheel centers of the wheels supported by said axle means, and further connecting means including said first-mentioned connecting means for guiding said axle means to enable angular movements about the vehicle longitudinal center axis, said second spring means being disposed approximately laterally of said first connecting means.

4. A spring system for vehicles, especially motor vehicles, with at least a partial separation of the functions of the springs by subdividing the springs into springs performing essentially supporting functions and springs essentially performing leveling functions with respect to tilting movements of the vehicle about a longitudinal axis, comprising a vehicle superstructure, axle means including an axle unit, a transverse bearer member and torsion-resistant means connecting said transverse bearer member with said axle unit, means spring-supporting said axle means with respect to said superstructure including first spring means for performing substantially the entire supporting function, second spring means for performing said leveling functions by exerting a leveling moment against said transverse bearer member, means for enabling adjustment of said second spring means in the sense of a change of the leveling moments produced thereby transmitted through said transverse bearer member, first connecting means for connecting said axle means to said vehicle superstructure for effective universal movement relative thereto, said first connecting means being disposed substantially in the vertical vehicle longitudinal center plane outside of the vertical vehicle transverse plane passing through the wheel centers of the wheels supported by said axle means, and further connecting means including said first connecting means for guiding said axle means to enable angular movements about the vehicle longitudinal center axis, said second spring means being disposed approximately laterally of said first-mentioned connecting means.

5. A spring system for vehicles having an axle means and a superstructure supported thereon by said spring system, especially motor vehicles, having a separation of the functions of the springs by separating the springs into springs performing essentially supporting functions and springs essentially performing leveling functions with respect to tilting movements of the vehicle superstructure about a longitudinal axis, comprising support spring means essentially providing the entire resilient support of the vehicle superstructure weight on said axle means, separate spring means for exerting leveling moments on the vehicle superstructure to perform said leveling function and being essentially non-responsive to said weight, and means for enabling adjustment of said separate spring means to provide a selective change of the leveling moment.

6. A spring system for vehicles having an axle means and a superstructure supported thereon by said spring system, especially motor vehicles, having a separation of the functions of the springs by separating the springs into springs performing essentially supporting functions and springs essentially performing leveling functions with respect to tilting movements of the vehicle superstructure about a longitudinal axis, comprising support spring means essentially providing the entire resilient support of the vehicle superstructure weight on said axle means, separate spring means for exerting leveling moments on the vehicle superstructure to perform said leveling function and being essentially non-responsive to said weight, and means for enabling adjustment of said separate spring means to provide a change of the leveling moment comprising control means including first adjusting means for adjusting said separate spring means in the direction of a change of the leveling moment to be produced thereby, and second adjusting means for regulating said separate spring means in dependence on the prevailing centrifugal force moments.

7. A spring system for vehicles having an axle means and a superstructure supported thereon by said spring system, especially motor vehicles, having a separation of the functions of the springs by separating the springs into springs performing essentially supporting functions and springs essentially performing leveling functions with respect to tilting movements of the vehicle superstructure about a longitudinal axis, comprising support spring means essentially providing the entire resilient support of the vehicle superstructure weight on said axle means, separate spring means for exerting leveling moments on the vehicle superstructure to perform said leveling function and being essentially non-responsive to said weight, and means for enabling adjustment of said separate spring means to provide a change of the leveling moment comprising control means including first adjusting means for adjusting said separate spring means in the direction of a change of the leveling moment to be produced thereby, second adjusting means for regulating said separate spring means in dependence on the prevailing centrifugal force moments, damping means coordinated to said separate spring means for regulating said separate spring means in dependance on the inertia moment of the vehicle superstructure about the longitudinal axis and third adjusting means for selectively controlling the regulation applied to said separate spring means by said damping means.

8. A spring system for vehicles having an axle means and a superstructure supported thereon by said spring system, especially motor vehicles, having a separation of functions of the springs by separating the springs into springs performing essentially supporting functions and springs essentially performing leveling functions with respect to tilting movements of the vehicle superstructure about a longitudinal axis, comprising support spring means essentially providing the entire resilient support of the vehicle superstructure weight on said axle means, separate spring means for exerting leveling moments on the vehicle superstructure to perform said leveling function, and being essentially non-responsive to said weight, and means for enabling adjustment of said separate spring means to provide a change of the leveling moment comprising control means including first adjusting means for adjusting said separate spring means in the direction of a change of the leveling moment to be produced thereby, second adjusting means for regulating said separate spring means in dependance on the prevailing centrifugal force moments, first damping means coordinated to said separate spring means for regulating said separate spring means in dependence on the inertia moment of the vehicle superstructure about the longitudinal axis, third adjusting means for selectively controlling the regulation applied to said separate spring means by said first damping means, and second damping means coordinated to said support spring means for regulating said support spring means in dependance on the inertia moment of the vehicle superstructure about a transverse vehicle axis, said second damping means being substantially non-responsive to sail tilting movements.

9. A spring system for vehicles having an axle means and a superstructure supported thereon by said spring system, especially motor vehicles, having a separation of the functions of the springs by separating the springs into springs performing essentially supporting functions and springs essentially performing leveling functions with respect to tilting movements of the vehicle superstructure about a longitudinal axis, comprising support spring means essentially providing the entire resilient support of the vehicle superstructure static weight on said axle means, separate spring means for exerting leveling moments on the vehicle superstructure to perform said leveling function and being essentially non-responsive to said static weight, and means for enabling adjustment of said separate spring means to provide a change of the leveling moment comprising control means for adjusting said separate spring means in the direction of a change of the leveling movement produced thereby including equalization means connected to said separate spring means for regulating the pressure therein and regulating means for varying the effectiveness of said equilization means.

10. A spring system for vehicles according to claim 9, wherein said regulating means is operable to throttle said equalization means between said second spring means.

11. A spring system for vehicles according to claim 9, wherein said regulating means between said second spring means is adapted to be selectively opened and closed.

12. A spring system for vehicles having an axle means and a superstructure supported thereon by said spring system, especially motor vehicles, having a separation of the functions of the springs by separating the springs into springs performing essentially supporting functions and springs essentially performing leveling functions with respect to tilting movements of the vehicle superstructure about a longitudinal axis, comprising support spring means essentially providing the entire resilient support of the vehicle superstructure static weight on said axle means, separate spring means for exerting leveling moments on the vehicle superstructure to perform said leveling function, and being essentially non-responsive to said static weight, said separate spring means comprising a pair of pneumatic spring means, and means for enabling adjustment of said separate spring means to provide a change of the leveling movement so constructed so as to enable adjustment thereof in the sense of a change of the erecting moment comprising control means for adjusting said separate spring means in the direction of a change of the leveling moment produced thereby including equalization means interconnecting said separate pneumatic spring means and regulating means for varying the effectiveness of said equalization means, separate damping means coordinated to each said separate pneumatic spring means, second equalization means interconnecting said damping means and second regulating means for varying the effectiveness of said second equalization means.

13. A spring system for vehicles according to claim 12, wherein said second regulating means is operable to throttle said second equalization means between said damping means.

14. A spring system for vehicles according to claim 12, wherein said second regulating means between said damping means is operable to selectively open or close said second equalization means.

15. A spring system for vehicles having an axle means and a superstructure supported thereon by said spring system, especially motor vehicles, having a separation of the functions of the springs by separating the springs into springs performing essentially supporting functions and springs essentially performing leveling functions with respect to tilting movements of the vehicle superstructure about a longitudinal axis, comprising support spring means essentially providing the entire resilient support of the vehicle superstructure weight on said axle means, separate spring means for exerting leveling moments on the vehicle superstructure to perform said leveling function and being essentially non-responsive to said weight, and means for enabling adjustment of said separate spring means to provide a change of the leveling moment comprising control means for adjusting said separate spring means in the direction of a change of the leveling moment produced thereby, and means operable to adjust said separate spring means for achieving an inwardly directed position of the vehicle superstructure in response to centrifugal forces.

16. A spring system for vehicles, especially motor vehicles, having a vehicle superstructure and axle means for supporting thereon the oppositely disposed vehicle wheels, comprising a substantially rigid unit including axle means, transverse bearer means extending substantially in a transverse vehicle plane spaced in the vehicle longitudinal direction from the vertical transverse plane of the vehicle passing through the centers of said wheels and torsion resistant means interconnecting said axle means with said transverse bearer means, means pivotally connecting said substantially rigid unit at said vehicle superstructure for universal movement with respect thereto at a point disposed essentially at the intersection of the verticle vehicle longitudinal center plane and of a vertical transverse plane passing through said transverse bearer means, second pivotal connecting means disposed also at a distance from the vertical transverse plane passing through the wheel centers for pivotally connecting said rigid combination at said vehicle superstructure in such a way that said rigid unit is able to perform angular movements about a transverse axis passing through said first pivotal connecting means and about a longitudinal axis extending through said first and second pivotal connecting means, support spring means essentially providing the entire resilient support for the weight of the respective end portion of said vehicle superstructure on said axle means comprising a pair of pneumatic springs disposed a relatively small distance from the vehicle axle means in the vehicle longitudinal direction and spaced from each other and on opposite sides of the said vertical vehicle longitudinal center plane a relatively small distance, separate spring means for exerting leveling moments on the vehicle superstructure to perform said leveling functions comprising a pair of pneumatic spring means disposed at a relatively large distance from the vertical vehicle longitudinal center plane, said pair of separate spring means being operatively connected between said transverse bearer means and said vehicle superstructure in said vertical transverse plane passing through the transverse bearer means, and means for enabling adjustment of said separate pneumatic spring means to provide a change in the leveling moment produced thereby comprising control means for adjusting said separate spring means in the direction of a change in the leveling moment produced thereby including equalization means interconnecting said separate pneumatic spring means and regulating means for varying the effectiveness of said equalization means, and damping means coordinated to each said separate pneumatic spring means, second equalization means interconnecting said damping means and second regulating means for varying the effectiveness of said second equalization means.

References Cited in the file of this patent

UNITED STATES PATENTS

| | | |
|---|---|---|
| 2,691,420 | Fox | Oct. 12, 1954 |
| 2,967,062 | D'Avigdor | Jan. 3, 1961 |